United States Patent
Pihl et al.

(10) Patent No.: US 11,297,321 B2
(45) Date of Patent: Apr. 5, 2022

(54) METHOD OF ENCODING A VIDEO SEQUENCE

(71) Applicant: Axis AB, Lund (SE)

(72) Inventors: Fredrik Pihl, Lund (SE); Viktor Edpalm, Lund (SE)

(73) Assignee: AXIS AB, Lund (SE)

( * ) Notice: Subject to any disclaimer, the term of this patent is extended or adjusted under 35 U.S.C. 154(b) by 0 days.

(21) Appl. No.: 16/708,436

(22) Filed: Dec. 10, 2019

(65) Prior Publication Data

US 2020/0204805 A1    Jun. 25, 2020

(30) Foreign Application Priority Data

Dec. 21, 2018 (EP) .................................... 18215001

(51) Int. Cl.
*H04N 19/13* (2014.01)
*H04N 19/124* (2014.01)
*H04N 19/176* (2014.01)
*H04N 19/196* (2014.01)

(52) U.S. Cl.
CPC ........... *H04N 19/13* (2014.11); *H04N 19/124* (2014.11); *H04N 19/176* (2014.11); *H04N 19/196* (2014.11)

(58) Field of Classification Search
CPC ...... H04N 19/00; H04N 19/13; H04N 19/124; H04N 19/176; H04N 19/196
See application file for complete search history.

(56) References Cited

U.S. PATENT DOCUMENTS

| | | | |
|---|---|---|---|
| 7,688,234 B2 | 3/2010 | Koo | |
| 7,864,839 B2 | 1/2011 | Zhang et al. | |
| 9,596,462 B2 | 3/2017 | Fuchie | |
| 9,961,346 B2 | 5/2018 | Mochizuki et al. | |
| 2006/0222063 A1* | 10/2006 | Zhang | H04N 19/53 375/240.03 |
| 2006/0256857 A1* | 11/2006 | Chin | H04N 19/124 375/240.03 |
| 2009/0175331 A1 | 7/2009 | Karczewicz et al. | |
| 2010/0220782 A1* | 9/2010 | Arakawa | H04N 19/152 375/240.02 |
| 2014/0036993 A1 | 2/2014 | Bae | |
| 2015/0092840 A1* | 4/2015 | Mochizuki | H04N 19/115 375/240.03 |
| 2017/0127064 A1 | 5/2017 | Sze et al. | |

FOREIGN PATENT DOCUMENTS

| | | |
|---|---|---|
| EP | 2150061 A1 | 2/2010 |
| JP | 2007-158430 A | 6/2007 |
| WO | 2018/155996 A1 | 8/2018 |

OTHER PUBLICATIONS

Sze, V. and Marpe, D., "Chapter 8 Entropy Coding in HEVC," High Efficiency Video Coding (HEVC): Algorithms and Architectures, Integrated Circuitsand Systems, DOI 10.1007/978-3-319-06895-4_8, © Springer International Publishing Switzerland, 2014, pp. 209-274.

* cited by examiner

*Primary Examiner* — Kyle M Lotfi

(74) *Attorney, Agent, or Firm* — Xsensus LLP

(57) ABSTRACT

A method of encoding a video sequence by an encoder supporting context-based adaptive binary arithmetic coding, CABAC is disclosed. The method comprises determining, by a rate controller, a compression parameter of the encoder based on a load parameter value, indicating a current actual load of the coding block, received from the coding block.

7 Claims, 3 Drawing Sheets

| $QP_{1,1}$ | $QP_{1,2}$ | $QP_{1,3}$ |
|---|---|---|
| $QP_{2,1}$ | $QP_{2,2}$ | $QP_{2,3}$ |
| $QP_{3,1}$ | $QP_{3,2}$ | $QP_{3,3}$ |

METHOD OF ENCODING A VIDEO SEQUENCE

CROSS-REFERENCE TO RELATED APPLICATION

The present application claims priority to EP 18215001.1, filed Dec. 21, 2018, the entire contents of which are incorporated herein by reference.

TECHNICAL FIELD

The present invention relates to the field of encoding a video sequence by an encoder supporting context-based adaptive binary arithmetic coding, CABAC.

BACKGROUND

In digital video systems, such as network camera monitoring systems, video sequences are compressed before transmission using various video encoding methods. In many digital video encoding systems, two main modes are used for compressing video frames of a sequence of video frames: intra mode and inter mode.

In the intra mode, luminance and chrominance channels of the video data are encoded by exploiting the spatial redundancy of the pixels in a given channel of a single frame via prediction, transform, and entropy coding. The encoded frames, being output from the encoder, are called intra-frames, and may also be referred to as I-frames. The encoding system in the inter mode instead exploits the temporal redundancy between separate frames and relies on a motion-compensation prediction technique that predicts parts of a frame from one or more previous frames by encoding the motion in pixels from one frame to another for selected blocks of pixels. Entropy coding is also applied to the video data encoded in the inter mode. In other words, many digital video encoding systems are Block Based Hybrid Encoders.

Two types of entropy coding that are used in the H.264/MPEG-4 AVC video compression standard are context-adaptive binary arithmetic coding (CABAC) and context-adaptive variable-length coding (CAVLC). The entropy coding is performed by a coding block, for example a CABAC coding block or a CAVLC coding block, of an encoder.

A drawback with the CABAC/CAVLC block of the encoder is its throughput, which is dictated by the number of binary symbols it can decode per second. This parameter is also known as bin rate of the coding block. It is costly to produce a CABAC/CAVLC coding block having a high throughput, compared to the cost of increasing the throughput in other types of coding blocks of the encoder. Hence, the CABAC/CAVLC block forms a potential bottleneck that limits the encoder's overall throughput. A limited throughput may be a problem in itself, but what may be even worse is that when the CABAC/CAVLC block reaches its maximum throughput frames of the presently encoded image sequence are discarded since they cannot be processed. This is a serious problem in for example surveillance applications where a discarded frame may include critical surveillance information.

A solution to the problem is to adjust a compression value of the encoder to lower the load on the CABAC/CAVLC block. The compression value may be a quantization parameter, QP, value. In such a solution, the load of the CABAC/CAVLC block is estimated or predicted based on characteristics of a part of the image data stream that is input to, or output from, the encoder. Based on the prediction, the QP value can be adjusted to reach a goal bitrate of the output data stream, which may also lower the risk of overloading the CABAC/CAVLC block with the image data. A drawback with this solution is that it requires a significant amount of processing in the encoder which in many applications is a limited resource.

Another solution includes implementing a CABAC/CAVLC block with higher throughput. However, such a solution is costly.

A less costly and simpler solution for handling the throughput of the CABAC/CAVLC block would therefore benefit the encoder performance, for example in an image data encoding application.

SUMMARY OF THE INVENTION

An aim of the present invention is to provide an improved encoding method for a video sequence, for which CABAC is used.

According to aspects of the invention, these and other objects are achieved, in full or at least in part, by a method and an encoder as defined by the appended independent claims.

In particular, the present invention provides a method of encoding a video sequence by an encoder supporting context-based adaptive binary arithmetic coding, CABAC. The method comprises
  acquiring a first set of image data by an image capturing device,
  encoding, by an encoder comprising a coding block that performs CABAC, the first set of image data into one or more image frames based on a first value of a compression parameter,
  receiving, in a rate controller and from the coding block, a load parameter value corresponding to a current actual load of the coding block,
  acquiring a second set of image data by the image capturing device,
  determining, by the rate controller, a second value of the compression parameter based on the received actual load parameter value,
  transmitting the determined second value of the compression parameter to the encoder, and
  encoding, by the encoder, the second set of image data into one or more image frames based on the second value of the compression parameter.

The invention relies on an approach to adjust the compression performed by the encoder with the aim of eliminating frame dropping in the encoder without losing image quality by applying an unnecessarily high compression. For these purposes, compression is not adjusted to achieve a particular bitrate of the data stream output from the encoder, but to adjust the actual load value of the CABAC coding block. The inventors have realized that an advantageous balance between encoder cost, processing requirements and quality of output stream is achieved by adjusting the compression based on an actual load value of the CABAC coding block. This block type (i.e. an entropy coding block based on CABAC) is selected since it has a high cost per increased throughput compared to other types of coding blocks in an encoder. Therefore, an actual load parameter value is acquired from the CABAC coding block and a rate controller determines a compression parameter value based on the current actual load. The adjustment may be iterated and performed continuously, preferably for each image frame, during encoding of the image data stream.

A further scope of applicability of the present invention will become apparent from the detailed description given below. However, it should be understood that the detailed description and specific examples, while indicating preferred embodiments of the invention, are given by way of illustration only, since various changes and modifications within the scope of the invention will become apparent to those skilled in the art from this detailed description.

Hence, it is to be understood that this invention is not limited to the particular component parts of the device described or steps of the methods described as such device and method may vary. It is also to be understood that the terminology used herein is for purpose of describing particular embodiments only, and is not intended to be limiting. It must be noted that, as used in the specification and the appended claim, the articles "a", "an", "the", and "said" are intended to mean that there are one or more of the elements unless the context clearly dictates otherwise. Thus, for example, a reference to "an object" or "the object" may include several objects, and the like. Furthermore, the word "comprising" does not exclude other elements or steps.

BRIEF DESCRIPTION OF THE DRAWINGS

The invention will now be described in more detail by way of example and with reference to the accompanying schematic drawings, in which.

DETAILED DESCRIPTION OF EMBODIMENTS

Figure 1:
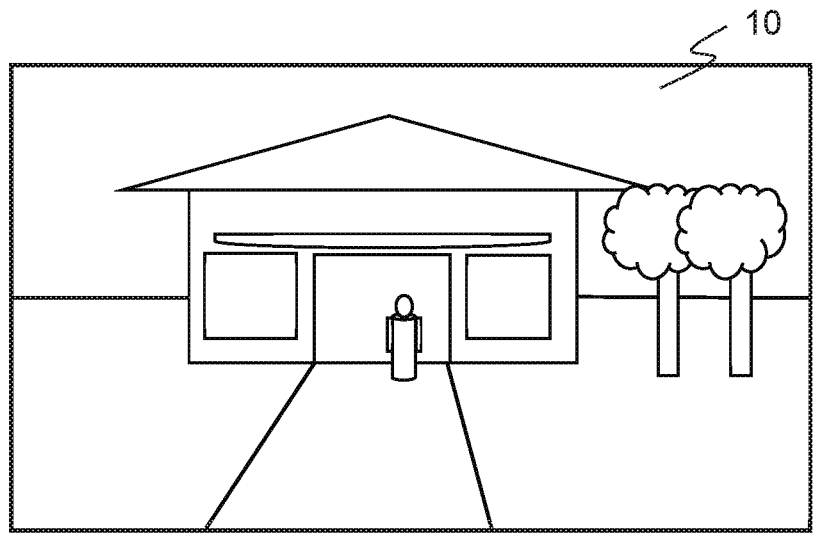
FIG. 1 illustrates a digital image depicting a monitored scene.
Figure 2:
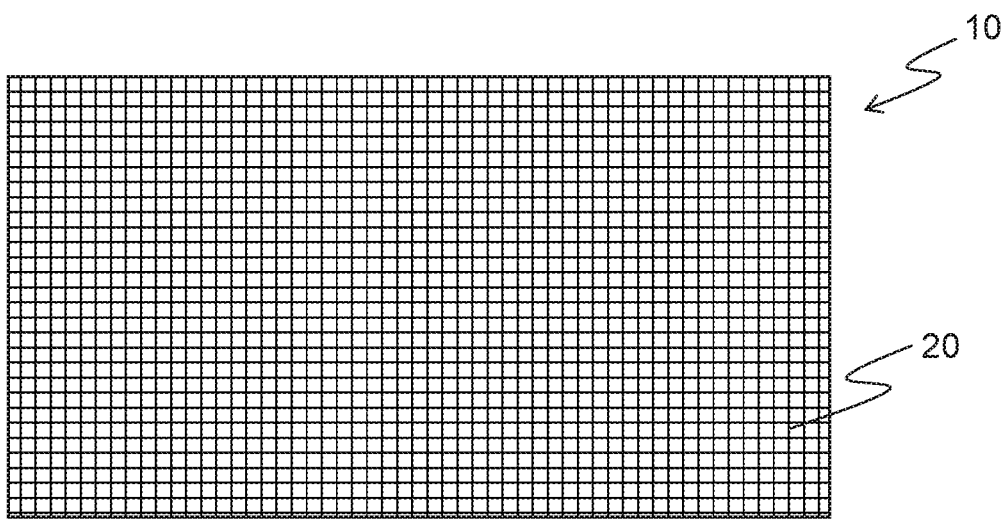
FIG. 2 illustrates the principal construction of the digital image in FIG. 1.

FIG. 1 illustrates a digital image 10 depicting a monitored scene. This image 10 represents one of a sequence of images in a video sequence captured by a digital monitoring camera. In FIG. 2, the principal construction of the image, as made up of a number of pixels 20, is illustrated. The image 10 may for instance be 1280 pixels wide and 960 pixels high, thus having about 1.3 MP.

Figures 3, 4:
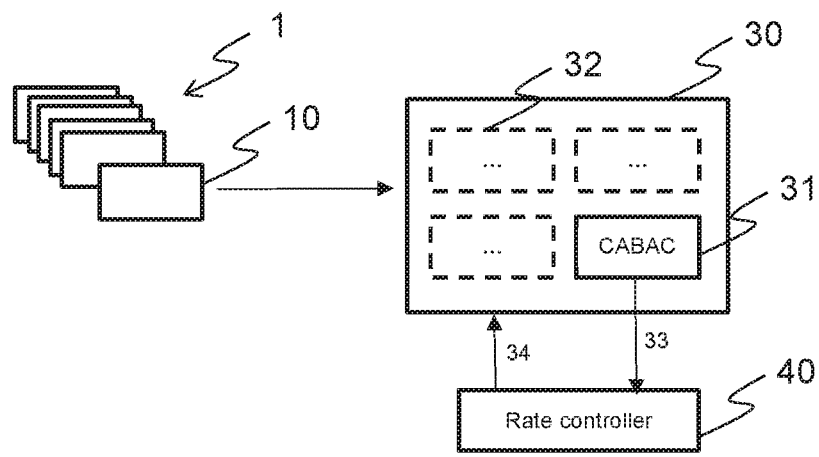
FIG. 3 is a schematic view of an encoder according to an embodiment.
FIG. 4 illustrates a QP map.

When the image 10 is to be transmitted to, e.g., a control center, where an operator or a guard may watch displayed images of monitored scenes, the sequence of images 1, including the image 10, has to be encoded and this is done by an encoder 30 illustrated in FIG. 3. In this example, the encoder 30 supports a codec working according to the H.264 compression format which is used for the encoding. The encoder 30 comprises different coding blocks, amongst others a CABAC block 31. Other conventional coding blocks 32, e.g. prediction block (for motion search), transformation block, quantization block, and decoding/reconstruction block, are also part of the encoder 30.

The image 10 to be encoded is partitioned into independent blocks, called macroblocks or pixel blocks (corresponding to coding units in the H.265 compression format), which are encoded individually.

When encoding the image 10, parameters such as group of pictures, GOP, length and compression parameter value(s) may be controlled in order to control the amount of data required for transmitting the encoded image, i.e. in order to control an output bit rate. It is desirable to be able to estimate and control the output bitrate, especially in applications where the bandwidth of the transmission medium, e.g. WiFi, Ethernet, is low. The use of a constant bitrate budget, is commonly applied for handling this issue. When coding with a constant bitrate budget, the encoder is adapted to control and modify encoder parameters to meet the predetermined constant bitrate of the output data stream. For example, in the H.264 compression format, an encoder parameter relating to compression of the image data can be controlled by adjusting a quantization parameter (QP). Some encoders implement a so called auto-QP algorithm adapted to adjust the QP value, on a macroblock level, to meet the set constant bitrate. Such algorithms may work perfectly fine for some applications, however for surveillance purposes it may be devastating. For example, in an acquired sequence of images of a surveillance scene, the required bitrate increases when the images include movement, i.e. when the images differ (partly) from each other, since intra frame encoding needs to be used to a larger extent. However, when the required bitrate increases, an auto-QP algorithm increases the QP for the encoding to maintain the constant bitrate. An increased QP results in a higher compression, thus a lower image quality. But the purpose of the surveillance is often to be able to detect, and even identify, movement occurring in the scene. Lowered image quality of image including movement counteracts that purpose. Consequently, auto-QP algorithms that works with the aim of maintaining a constant bitrate are, in general, not suitable for surveillance applications.

The invention relies on an approach to control a compression parameter so as to achieve a complete image stream with as high image quality as possible, not to maintain a constant bitrate of the encoded data stream. The control should be adapted to the CABAC coding block, which is the narrowest throughput of the encoder 30, to avoid that frames (that may include important data) of the image frame sequence 1 are dropped (i.e. not part of the output stream) during the encoding process. In this way, an encoding process adapted for the surveillance application (being sensitive to loosing image data and often requiring live performance) and with a lowered risk of losing image data is achieved. The invention proposes a solution for these types of applications, that is a solution in which a constant bitrate budget is undesired and a complete data stream, without dropped frames, with high quality is aimed at.

To this purpose, a rate controller 40 is connected to the encoder 30. It is noted that the rate controller 40 can alternatively be included in the encoder 30. The rate controller 40 is connected to the CABAC block 31. It is noted that the rate controller 40 may have other functions and be connected to other encoder blocks as well.

The CABAC block 31 is adapted to output a load parameter, LP, value 33 which represents a current actual load of the CABAC block 31. By actual load parameter value is meant a value that indicates the actual (real) throughput of the block. The actual load value is neither an estimation nor a prediction. This distinction is important since a readout of an actual value eliminates the need for prediction/estimation processing. Processing is a limited resource in for example monitoring applications. Unnecessary processing is also time-consuming which limits the possible encoding speed, which is particularly undesirable in surveillance applications.

The actual load parameter value 33 may be calculated based on an encoded image frame that has not yet been processed by the CABAL coding block. However, a previously encoded image frame may also work as a reference. Further, the load parameter value 33 may be calculated based on the residuals of the blocks in the frame before they are passed though the CABAC coding block. The residuals of the blocks in the frame is correlated to the load the CABAC coding block will experience coding the blocks. One encoded frame is enough to be able to calculate the load parameter value. It is possible to calculate the load parameter value based on a plurality of encoded image frames as well. However, the inventors have realized that a load parameter value calculated based on only one encoded frame is sufficiently precise to be able to control the compression for the purpose of the invention. This realization enables a very processing efficient and fast adjustment of the compression.

The load parameter LP may be expressed as the current actual bin count of the CABAC block 31, which often is expressed in bins per cycle. The load parameter, LP, value 33 is received by the rate controller 40. The rate controller 40 evaluates the current LP value 33 of the CABAC block 31 by, e.g., comparing the LP value 33 with a maximum LP value that the CABAC block 31 can work on. If the current LP value 33 is close to, e.g. less than 10% from, the maximum LP value, this indicates that the CABAC block 31 is close to its maximum performance. On the other hand, if the current LP value 33 is much lower than the maximum LP value, this indicates that the CABAC block 31 has available resources. Based on the comparison, the rate controller 40 determines a compression parameter value CP that is transmitted back to the encoder 30, for example to a quantization block or to a prediction block, which the encoder 30 bases the continued encoding process on. The process is repeated and the rate controller 40 may send an updated/new compression parameter value CP regularly to the encoder 30.

The rate controller 40 may be implemented as a hardware component or a software component. In a hardware implementation, the rate controller 40 may correspond to circuitry which is dedicated and specifically designed to provide functionality of the part. The circuitry may be in the form of one or more integrated circuits, such as one or more application specific integrated circuits or one or more field-programmable gate arrays. In a software implementation, the circuitry may instead be in the form of a processor, such as a microprocessor, which in association with computer code instructions stored on a (non-transitory) computer-readable medium, such as a non-volatile memory, causes the rate controller 40 to carry out (part of) any method disclosed herein. Examples of non-volatile memory include read-only memory, flash memory, ferroelectric RAM, magnetic computer storage devices, optical discs, and the like.

The compression parameter value CP may be determined relative the current compression parameter value. In a simple example, the compression parameter value CP may be set one step above the current compression parameter value upon the current LP being close to the maximum LP value. Alternatively, in a similar scenario, the compression parameter value CP may be determined based on an estimation of how much increase is needed based on an analysis of recently captured image data reflecting behavior of the camera.

There are a number of compression parameters that can be used depending on compression algorithm that is used by the encoder. Some preferred embodiments will now be disclosed where different compression algorithms are used.

In a first embodiment, the encoder implements a compression algorithm wherein a QP value is determined on frame level, i.e. that each macroblock is encoded based on the same QP value. In this embodiment, the rate controller 40 determines a compression parameter, CP, value 34, based on the current actual LP value 33 received from the CABAC coding block 31, that is a frame QP value.

In a second embodiment, the encoder implements a compression algorithm wherein QP values are determined on macroblock level. In other words, each macroblock is assigned a QP value which can differ from QP values of other macroblocks in the same frame. In this embodiment, the rate controller 40 determines a CP value 34, based on the current actual LP value 33 received from the CABAC coding block 31, that is a set of macroblock QP values. The set of macroblock QP values may be presented in the form of look-up table (LUT) which maps each macroblock with its QP value.

In a third embodiment, the encoder implements a compression algorithm wherein a base QP value is determined on frame level and a delta QP (ΔQP) value is determined on macroblock level. Instead of setting individual QP values for the macroblocks, an offset, being the LOP, in compression value, relative the base QP value, is set for each macroblock. For instance, a frame QP value, e.g., QP=28 may be set as a base QP value for all macroblocks in a frame. Based on frame analysis, e.g., identification of relevant and not relevant areas in the frame, offsets ΔQP relative the base QP value may be set for each macroblock. The offset for each macroblock may be stored in positions corresponding to the positions of the macroblocks in the image in a QP map as illustrated in FIG. 4 where $QP_{R,\,C}$ represents the offset ΔQP value for a group of pixels (forming a macroblock) in row R, column C. In this embodiment, the rate controller 40 may determine a CP value 34, based on the current actual LP value 33 received from the CABAC coding block 31, that comprises a base QP value and a QP map.

In a fourth embodiment, the encoder implements a compression algorithm using a transform matrix when performing the compression. Transformation of the image data to another domain is a common technique used in compression algorithms. The transformation is executed using a transform matrix which affects the level of compression. In this embodiment, the rate controller 40 determines a transform matrix, based on the current actual LP value 33 received from the CABAC coding block 31, that is a transform matrix.

From the above non-limiting examples of embodiments, it is apparent that the invention may be implemented in various forms, and in particular for various types of compression parameters and compression algorithms.

Figure 5:
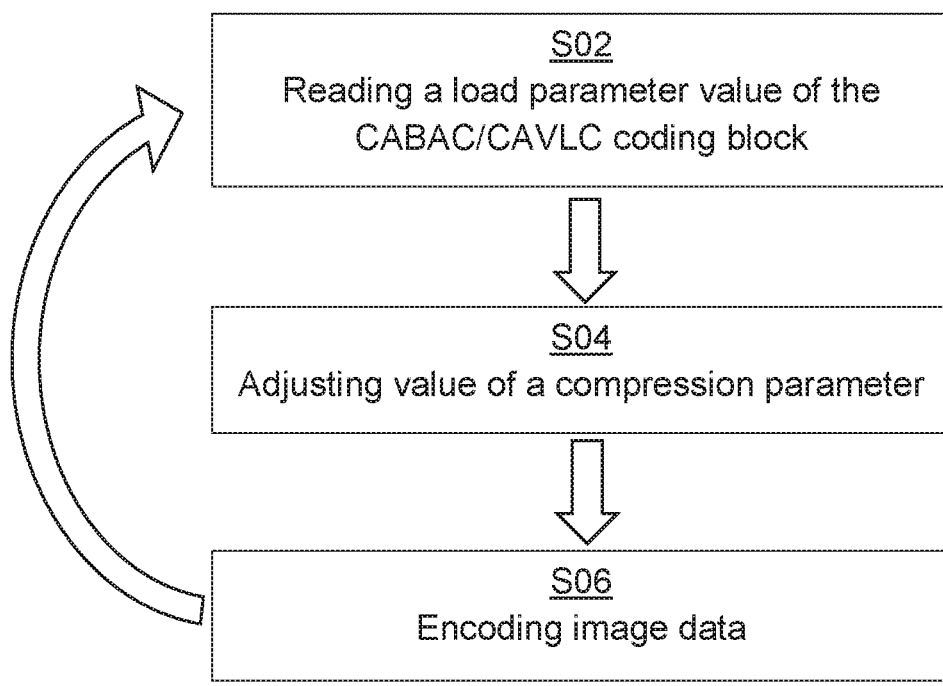
FIG. 5 shows a flow chart of a method for adjusting a compression parameter value according to an embodiment.

The inventive concept may be implemented according to a process scheme illustrated in FIG. 5. The inventive concept includes a step S02 of reading the load parameter value from the CABAC block 31, which is indicative of the load of the CABAC block 31 when encoding a first set of image data of an image sequence.

The read-out step is performed by the rate controller 40. A rate controller initiated read-out of the load parameter would be one realistic implementation, however the inventive scope does not exclude that the load parameter value may instead be regularly output from the CABAC block 31 to the rate controller 40.

Based on an evaluation of the current load parameter that is read-out from the CABAC block 31, the rate controller 40 adjusts S04 the current value of the compression parameter, as discussed and exemplified above.

Based on the adjusted compression parameter value, the encoder 30 encodes a second set of image data of the image sequence.

The steps S02, S04, and S06 can be repeated to form an iterative method of adjusting the compression parameter of the encoder 30.

In the above the inventive concept has mainly been described with reference to a limited number of examples. However, as is readily appreciated by a person skilled in the art, other examples than the ones disclosed above are equally possible within the scope of the inventive concept, as defined by the appended claims. For example, the compression may be performed based on another compression parameter than the ones exemplified herein. In such a case, the rate controller 40 may adjust that other compression parameter in order to achieve the desired change in the load parameter of the CABAC block of the encoder.

The invention claimed is:

1. A method of encoding a video sequence by an encoder supporting context-based adaptive binary arithmetic coding, CABAC, the method comprising:
   acquiring a first set of image data by an image capturing device,
   encoding, by an encoder comprising a coding block that performs CABAC, the first set of image data into one or more image frames based on a first value of a compression parameter,
   outputting, by the coding block, a load parameter value which represents a current actual bin count of the coding block, wherein the load parameter value is calculated based on only one image frame,
   receiving, in a rate controller and from the coding block, the load parameter value,
   comparing, by the rate controller, the load parameter value with a maximum load parameter value that corresponds to a maximum performance of the CABAC block,
   determining, by the rate controller, a second value of the compression parameter based on the comparison, wherein the compression parameter is increased from the first value to the second value if the load parameter value is less than a threshold value from the maximum load parameter value,
   transmitting the determined second value of the compression parameter to the encoder,
   acquiring a second set of image data by the image capturing device, and
   encoding, by the encoder, the second set of image data into one or more image frames based on the second value of the compression parameter.

2. The method according to claim 1, wherein the compression parameter includes a set of quantization parameter, QP, values indicating a QP value for each image frame macroblock.

3. The method according to claim 1, wherein the compression parameter includes a frame level quantization parameter, QP.

4. The method according to claim 1, wherein the compression parameter includes a base quantization parameter, QP, value and a QP map indicating a macroblock level QP value offset.

5. Use of the method according to claim 1 for encoding a surveillance video sequence.

6. An encoder system comprising a coding block that performs CABAC in an encoder and a rate controller, wherein the encoder system is configured to:
   receive a first set of image data acquired by an image capturing device,
   encode, by the CABAC coding block comprised in the encoder, the first set of image data into one or more image frames based on a first value of a compression parameter,
   output, by the coding block, a load parameter value which represents a current actual bin count of the coding block, wherein the load parameter value is calculated based on only one image frame,
   receive, in the rate controller, the load parameter value from the coding block,
   compare, by the rate controller, the load parameter value with a maximum load parameter value that corresponds to a maximum performance of the CABAC block,
   determine, by the rate controller, a second value of the compression parameter based on the comparison, wherein the compression parameter is increased from the first value to the second value if the load parameter value is less than a threshold value from the maximum load parameter value,
   transmit, from the rate controller, the determined second value of the compression parameter to the encoder,
   receive a second set of image data acquired by the image capturing device, and
   encode the second set of image data into one or more image frames based on the received second value of the compression parameter.

7. The encoder system according to claim 6, wherein the rate controller and the coding block are included in the same encoder.

* * * * *